2,900,388
Patented Aug. 18, 1959

2,900,388
ACYL HYDRAZINE DERIVATIVES OF BIS(4-DIMETHYLAMINOPHENYL) METHANE AND PROCESS

Jack M. Tien, Mount Vernon, N.Y.

No Drawing. Application August 8, 1957
Serial No. 677,165

28 Claims. (Cl. 260—295)

This invention relates to the new coloring matters, more particularly to the new coloring matters of the acyl hydrazine series having the formula

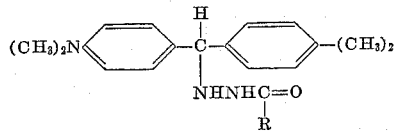

wherein COR is an organic carboxylic acid acyl group and R is a monovalent radical, defined later herein, selected from the group consisting of alkyl, phenyl, substituted phenyl, naphthyl, halogen substituted naphthyl, pyridyl, substituted pyridyl, pyrimidyl, thienyl, substituted thienyl, furyl, and substituted furyl.

The present application is a continuation-in-part of my copending applications Serial No. 670,644, filed July 9, 1957, now abandoned, and Serial No. 562,795, filed February 1, 1956, and is particularly directed to the process for manufacturing the novel compounds as defined hereinabove and to the novel compounds themselves.

The new coloring matters are essentially colorless in their normal state, yet are capable of generating color immediately upon being brought into intimate contact with a color initiator such as hydrated aluminum silicate, clay, and phenols. The contact may be achieved by the use of solvents; and by the use of pressure or heat with or without solvents.

The novel compounds of my invention are cheap to manufacture, stable in storage and in handling, and useful as a principal source of the colorless form of a coloring agent for duplication processes, such as carbon paper, manifold or pressure sensitive paper, heat sensitive paper, master sheets for hectograph printing, ink for stenciling, typewriter ribbon, and finger and foot printing and the like.

One way to manufacture my compounds involves reaction of the selected acid hydrazide with Michler's Hydrol, which is bis(4-dimethylaminophenyl)methanol, suitably in polar solvents such as methanol ethanol, and dioxane according to the equation:

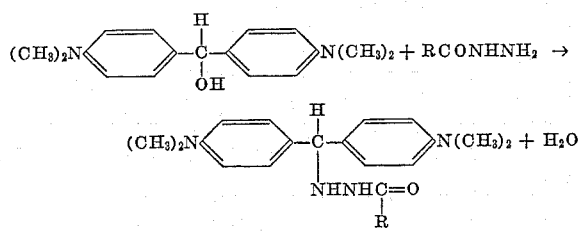

R, as used here and elsewhere herein, is a monovalent group such as any $C_1$ to $C_{20}$ alkyl group of which examples are lauryl, myristyl, palmityl, and stearyl; phenyl, and substituted phenyl of the formula

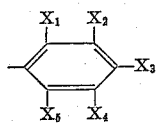

such as dichlorophenyl, chloro-nitrophenyl, and 4-methoxyphenyl; pyridyl and substituted pyridyl of the formula

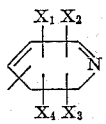

such as 2,6-dichloro-4-pyridyl, 2,6-dihydroxy-4-pyridyl and tetrachloro-4-pyridyl; thienyl and substituted thienyl of the formula

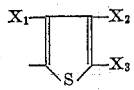

such as chloro-2-thienyl, chloro-nitro-2-thienyl and methyl-2-thienyl; naphthyl and halogen substituted naphthyl; pyrimidyl and furyl and substituted furyl of the formula

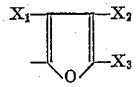

such as nitro-2-furyl, chloro-2-furyl and methyl-2-furyl; and $X_1$ to $X_5$ are hydrogen, halogen, hydroxy, lower alkyl, lower alkoxy, and nitro monovalent radicals.

An ester and a hydrazine may be condensed in the same manner according to the equation:

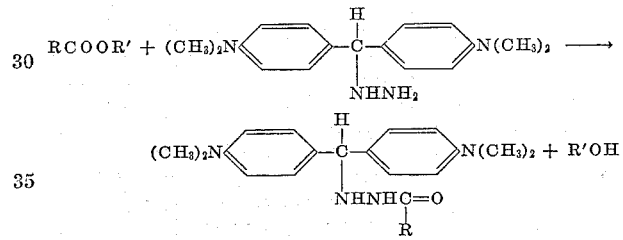

wherein R' stands for a monovalent radical of lower alkyl group.

Wide variation in reaction conditions is permissible. Thus, the reaction may be carried out either in the presence or absence of solvent. The reaction temperature may be varied from the room temperature to about 180° C. While it is advantageous to employ stoichiometric amounts of reactants, either one may be present in excess.

Another way to manufacture my compounds is by reaction, in pyridine, of an acid halide with the bis(4-dimethylaminophenyl)methylhydrazine, which in turn is made by reducing the monohydrazone of 4,4'-bis(dimethylamino)benzophenone, known as Michler's Ketone or by condensation of Michler's Hydrol with hydrazine according to the equation:

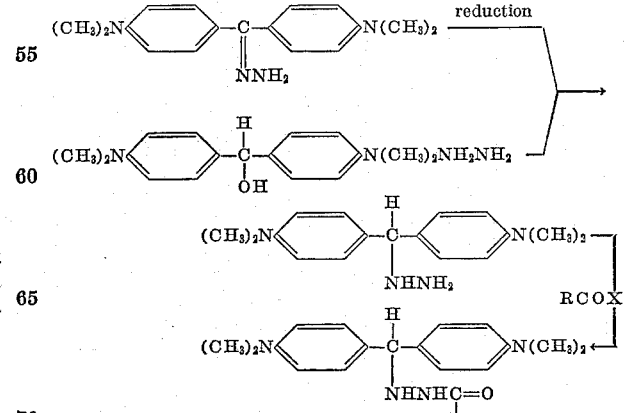

wherein X is a radical of halogen group.

Another way to manufacture my compounds is by reduction of the hydrazone prepared from Michler's Ketone and an acid hydrazide which in turn is also made by reaction of Michler's Ketone monohydrazone with an acid halide or an ester according to the equation below:

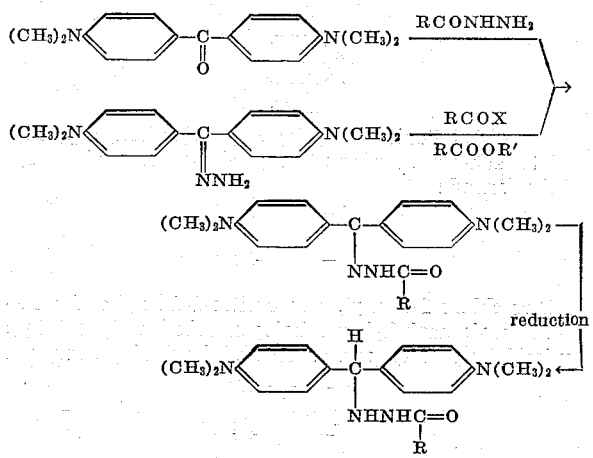

wherein R, R' and X are defined hereinabove.

This invention also includes the preparation of the halogenated benzoic acid hydrazides which are valuable as one parent component for production of my novel compounds as defined hereinabove.

Halogenated benzoic acid hydrazides are readily prepared by reaction of hydrazine with halogenated benzoic acid halides or the esters of halogenated benzoic acids which may be made either by halogenating the ester of benzoic acid or by halogenating the benzoyl halide followed by esterification. Thus, the chlorinated ethyl benzoate may be prepared by bubbling chlorine into benzoyl chloride containing one percent catalyst such as iron, aluminum, iodine or their mixture at 50° to 60° C. until the increase in weight of chlorine indicates the desired reaction is complete. After purification by fractional distillation or removal of free chlorine and hydrogen chloride by suction, the chlorinated benzoyl chloride can be converted into ethyl ester by refluxing with ethanol. The corresponding hydrazide may be obtained by treatment of the resulting ethyl ester with hydrazine in a suitable solvent, usually methanol or ethanol.

I have accurately defined my invention, its scope, and its uses. Now I shall proceed to illustrate but not limit my invention by the following detailed examples:

EXAMPLE 1

*1-bis(4-dimethylaminophenyl)methyl-2-benzoylhydrazine*

A mixture of 2.9 g. benzoic acid hydrazide and 5.7 g. Michler's Hydrol in 60 ml. absolute ethanol is refluxed for three hours. On standing overnight, the solution deposits a dark semisolid, which is filtered and decolorized with activated charcoal in boiling benzene solution. The crude product which precipitates an addition of petroleum ether is collected, redissolved in hot benzene, and diluted with petroleum ether. On cooling, colorless prisms, M.P. 142° to 146° C., are obtained. *Analysis.*—Calc. for $C_{24}H_{28}N_4O$: C, 74.15; H, 7.22; N, 14.44. Found: C, 74.10; H, 7.00; N, 14.62.

Replacement of benzoic acid hydrozide by ethyl benzoate and of Michler's Hydrol by bis(4-dimethylaminophenyl)methylhydrazine in the theoretical portions produces the same result. This colorless crystalline material may also be produced by refluxing a 1:1.1 mixture of bis(4-dimethylaminophenyl)methylhydrazine and benzoyl chloride in pyridine or by reduction of the hydrazone prepared from Michler's Ketone and benzoic acid hydrazide or by reduction of the hydrazone prepared from Michler's Ketone monohydrazone and benzoyl chloride or ethyl benzoate. The product may be isolated in the usual manner.

EXAMPLE 2

*1-bis(4-dimethylaminophenyl)methyl-2-(3-nitrobenzoyl) hydrazine*

To a solution of 3.6 g. 3-nitrobenzoic acid hydrazide in 60 ml. absolute ethanol is added 6 g. Michler's Hydrol. The resulting mixture is heated under reflux for three hours. The dark precipitate which forms on cooling is separated by filtration. The crude product is recrystallized from hot benzene with the use of activated carbon to yield tiny light orange-yellow needles, M.P. 139° to 144° C. *Analysis.*—Calc. for $C_{24}H_{27}N_5O_3$: C, 66.68; H, 6.28; N, 16.20. Found: C, 66.40; H, 6.10; N, 16.40.

The para isomer which may be prepared in the same way with the same molecular proportions of reagents also is a light orange-yellow crystalline material, as are the 2-chloro-5-nitro and 4-chloro-3-nitrobenzoylhydrazines.

It is to be understood the designation, colorless or color-free, is taken to include a light orange-yellow color, since so small amount of the crystalline substance in the solvent or carrier for making the coloring agent is substantially colorless.

EXAMPLE 3

*1-bis(4-dimethylaminophenyl)methyl-2-isonicotinoyl-hydrazine*

3.5 g. isonicotinic acid hydrazide and 6.8 g. Michler's Hydrol in 100 ml. absolute ethanol are heated under reflux for about four hours. After cooling, the precipitate is filtered, dissolved in hot benzene, and decolorized with activated charcoal. From the hot filtrate small sparkling colorless cubic crystals separate rapidly, M.P. 180° to 182° C. *Analysis.*—Calc. for $C_{23}H_{27}N_5O$: C, 70.92; H, 6.99; N, 17.98. Found: C, 70.70; H, 6.80; N, 18.10.

The isonicotinic acid hydrazide may be replaced by one of the following compounds: the hydrazide of nicotinic acid, 2-picolinic acid, tetrachloroisonicotinic acid, 2,6-dichloroisonicotinic acid, 2,6-dihydroxyisonicotinic acid, and 2,6-dihydroxy-3,5-dichloroisonicotinic acid in the same mole proportions. Each of the products is a colorless crystalline material. Similarly, 1-bis(4-dimethylaminophenyl)methyl-2-stearoylhydrazine, 1-bis(4-dimethylaminophenyl)methyl-2-palmitoylhydrazine, or 1-bis(4-dimethylaminophenyl)methyl-2-myristoylhydrazine is obtained as white crystalline substance by replacing isonicotinic acid hydrazide with the hydrazide of stearic, palmitic or myristic acid respectively.

EXAMPLE 4

A. *Intermediate 2,4-dichlorobenzoic acid hydrazide*

10 g. ethyl 2,4-dichlorobenzoate prepared from absolute ethanol and 2,4-dichlorobenzoyl chloride and 4 ml. anhydrous hydrazine in 50 ml. ethanol are refluxed for about one hour. Long colorless needles crystallize out on cooling. They are washed with water to remove excess hydrazine and recrystallized from hot methanol, M.P. 166° to 168° C. *Analysis.*—Calc. for $C_6H_7N_2OCl_2$: C, 41.00; H, 2.93; N, 13.65. Found: C, 41.30; H, 2.60; N, 13.90.

5 g. 2,4-dichlorobenzoyl chloride may be used instead of ethyl 2,4-dichlorobenzoate provided that the reaction is performed with cooling.

B. *1-bis(4-dimethylaminophenyl)methyl-2-(2,4-dichlorobenzoyl)hydrazine*

A mixture of 3.4 g. 2,4-dichlorobenzoic acid hydrazide and 4.8 g. Michler's Hydrol in 50 ml. ethanol is heated under reflux for about 4 hours. After stripping off most of the solvent, the crude product which separates on cooling is collected, dissolved in hot benzene and treated with clay or activated carbon. The addition of petroleum ether to the benzene filtrate produces an almost white precipitate which is recrystallized from hot benzene, yielding colorless prisms, M.P. 161° to 163° C. *Analysis.*— Calc. for $C_{24}H_{26}N_4OCl_2$: C, 63.00; H, 5.68; N, 12.24. Found: C, 63.50; H, 5.40; N, 12.60.

The 2,3-; 2,5-; 2,6-; 3,4-; or 3,5-dichloroisomer may be prepared as a colorless crystalline substance through the same process.

EXAMPLE 5

A. *Intermediate mixed dichlorobenzoic acid hydrazide*

Chlorine is passed into 5.6 g. benzoyl chloride containing 0.04 g. of fine iron powder and 0.02 g. of iodine at 50° to 60° C. until there is an increase in weight of 3.2 g. After removal of the free chlorine and hydrogen chloride by sucking air through the mixture, the net increase in weight is reduced to 2.8 g., which corresponds to the theoretical quantity. While the crude dichlorobenzoyl chloride may be used to prepare the corresponding hydrazides by direct treatment with hydrazine, it is advantageous first to esterify it by refluxing the crude material for one hour with 25 ml. absolute ethanol and 4 ml. pyridine. After removal of ethanol by evaporation, the oily residue is washed thoroughly with water to remove pyridine and any chlorides and is heated under reflux for two to three hours with three ml. anhydrous hydrazine in 25 ml. ethanol. The resulting solution is poured with stirring into a large volume of water. The white solid, M.P. 135° to 166° C. is collected.

B. *1-bis(4-dimethylaminophenyl)methyl-2-dichlorobenzoylhydrazine*

The same procedure as in example 4B then produces a white solid which melts from 138° to 163° C. This white material may also be made by condensing the ethyl dichlorobenzoate and bis(4-dimethylaminophenyl)methylhydrazine in ethanol.

What is claimed is:

1. A compound having the structural formula

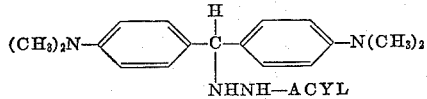

in which "ACYL" is a radical selected from the group consisting of the radicals of an alkanoic acid of from 1–20 carbon atoms, benzoyl, naphthoyl, and these aromatic radicals substituted by not more than two radicals of the group halogen, hydroxy, lower alkyl, lower alkoxy, and nitro, and pyridyl carbo, chloropyridylcarbo, and dihydroxypyridylcarbo, and thienyl carbo, and furylcarbo.

2. A compound having the structural formula

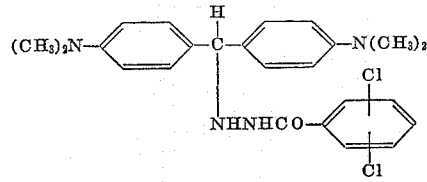

3. A compound having the structural formula

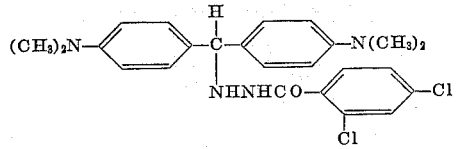

4. 1-bis(4-dimethylaminophenyl)methyl-2-(3,4-dichlorobenzoyl)hydrazine.

5. 1-bis(4-dimethylaminophenyl)methyl-2-(monochlorobenzoyl)hydrazine.

6. 1-bis(4-dimethylaminophenyl)methyl-2-mononitrobenzoylhydrazine.

7. 1-bis(4-dimethylaminophenyl)methyl-2-(p-nitrobenzoyl)hydrazine.

8. 1-bis(4-dimethylaminophenyl)methyl-2-(m-nitrobenzoyl)hydrazine.

9. A compound having the structural formula

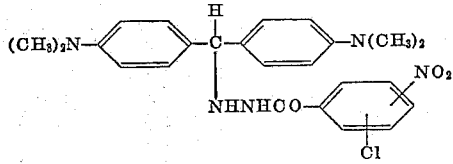

10. A compound having the structural formula

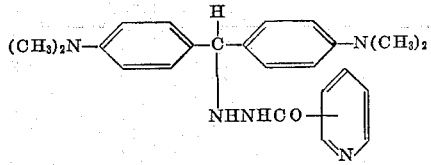

11. A compound having the structural formula

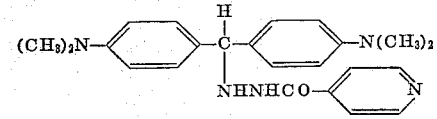

12. A compound having the structural formula

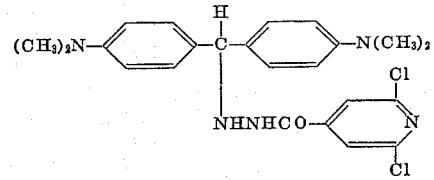

13. A compound having the structural formula

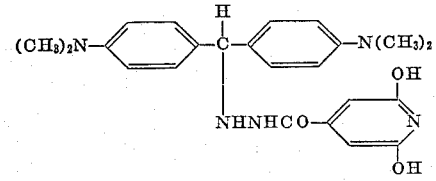

14. A compound having the structural formula

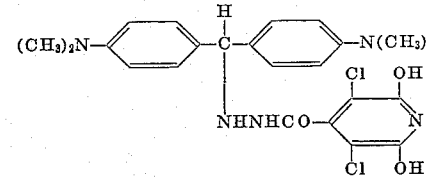

15. A compound having the structural formula

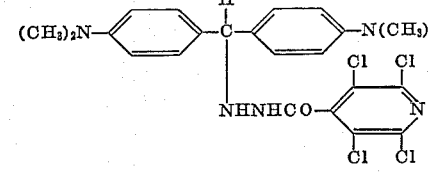

16. 1-bis(4-dimethylaminophenyl)methyl-2-benzoylhydrazine.

17. A process for the production of 1-bis(4-dimethylaminophenyl)-methyl-2-(chlorine substituted benzoyl)hydrazine which comprises reacting bis(4-dimethylaminophenyl)methanol with a chlorine substituted benzoic acid hydrazide.

18. A process for the production of 1-bis(4-dimethylaminophenyl)-methyl-2-dichlorobenzoylhydrazine which comprises reacting the bis(4-dimethylaminophenyl)methanol with dichlorobenzoic acid hydrazide.

19. A process for the production of 1-bis(4-dimethylaminophenyl) - methyl-2-(2,4-dichlorobenzoyl)hydrazine which comprises reacting the bis(4-dimethylaminophenyl)methanol with 2,4-dichlorobenzoic acid hydrazide.

20. A process for the production of 1-bis(4-dimethylaminophenyl) - methyl-2-(3,4-dichlorobenzoyl)hydrazine which comprises reacting the bis(4-dimethylaminophenyl)methanol with 3,4-dichlorobenzoic acid hydrazide.

21. Process for preparing 1-bis(4-dimethylaminophenyl)methyl-2-aroylhydrazine which comprises reacting the bis(4-dimethylaminophenyl)methanol with an aromatic monocarboxylic acid hydrazide.

22. Process for preparing 1 - bis(4 - dimethylaminophenyl)methyl - 2 - halogenated benzoylhydrazine which comprises reacting bis(4-dimethylaminophenyl)-methanol with a halobenzoic acid hydrazide.

23. Process for preparing 1-bis(4-dimethylaminophenyl)methyl - 2 - monochlorobenzoylhydrazine which comprises reacting bis(4-dimethylaminophenyl)methanol with a monochlorobenzoic acid hydrazide.

24. Process for preparing 1 - bis(4 - dimethylaminophenyl)methyl-2-nitrobenzoylhydrazine which comprises reacting bis(4-dimethylaminophenyl)methanol with a nitrobenzoic acid hydrazide.

25. Process for preparing 1 - bis(4 - dimethylaminophenyl)methyl-2-(3-nitrobenzoyl)hydrazine which comprises reacting bis(4 - dimethylaminophenyl) - methanol with m-nitrobenzoic acid hydrazide.

26. Process for preparing 1 - bis(4 - dimethylaminophenyl)methyl-2-(pyridine monocarboxylic acid acyl) hydrazine which comprises reacting bis(4-dimethylaminophenyl)methanol with a pyridine monocarboxylic acid hydrazide.

27. Process for preparing 1 - bis(4 - dimethylaminophenyl)methyl-2-isonicotinylhydrazine which comprises reacting bis(4-dimethylaminophenyl)methanol with isonicotinic acid hydrazide.

28. Process for preparing 1 - bis(4 - dimethylaminophenyl)methyl-2-benzoylhydrazine which comprises reacting bis(4-dimethylaminophenyl)methanol with benzoic acid hydrazide.

References Cited in the file of this patent

UNITED STATES PATENTS

| | | |
|---|---|---|
| 2,714,595 | Bernstein et al. | Aug. 2, 1955 |
| 2,746,968 | Hegedus | May 22, 1956 |
| 2,810,725 | Bernstein | Oct. 22, 1957 |

FOREIGN PATENTS

| | | |
|---|---|---|
| 106,721 | Germany | Oct. 26, 1899 |
| 116,352 | Germany | Nov. 27, 1900 |
| 116,566 | Germany | Dec. 3, 1900 |
| 729,348 | Great Britain | May 4, 1955 |

OTHER REFERENCES

Mohlau et al.: Ber. Deut. Chem., vol. 35, pp. 365-6 (1902).

UNITED STATES PATENT OFFICE
Certificate of Correction

Patent No. 2,900,388                                      August 18, 1959

Jack M. Tien

It is hereby certified that error appears in the printed specification of the above numbered patent requiring correction and that the said Letters Patent should read as corrected below.

Column 1, lines 15 to 20, the formula should appear as shown below instead of as in the patent:

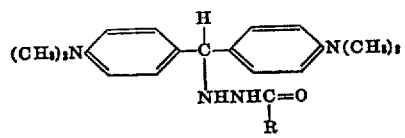

line 51, after "methanol" insert a comma; column 2, lines 4 to 7, the formula should appear as shown below instead of as in the patent:

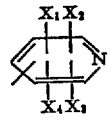

lines 53 to 59, right-hand portion of the structural formula, for

column 3, lines 15 to 18, for that portion of the formula reading

line 60, for "an addition" read —on addition—; line 66, for "hydrozide" read —hydrazide—.

Signed and sealed this 18th day of October 1960.

[SEAL]

Attest:
KARL H. AXLINE,
*Attesting Officer.*

ROBERT C. WATSON,
*Commissioner of Patents.*